R. H. GRIFFITH.
IMPLEMENT PULVERIZER DISK.
APPLICATION FILED JAN. 8, 1921.
1,405,581.
Patented Feb. 7, 1922.
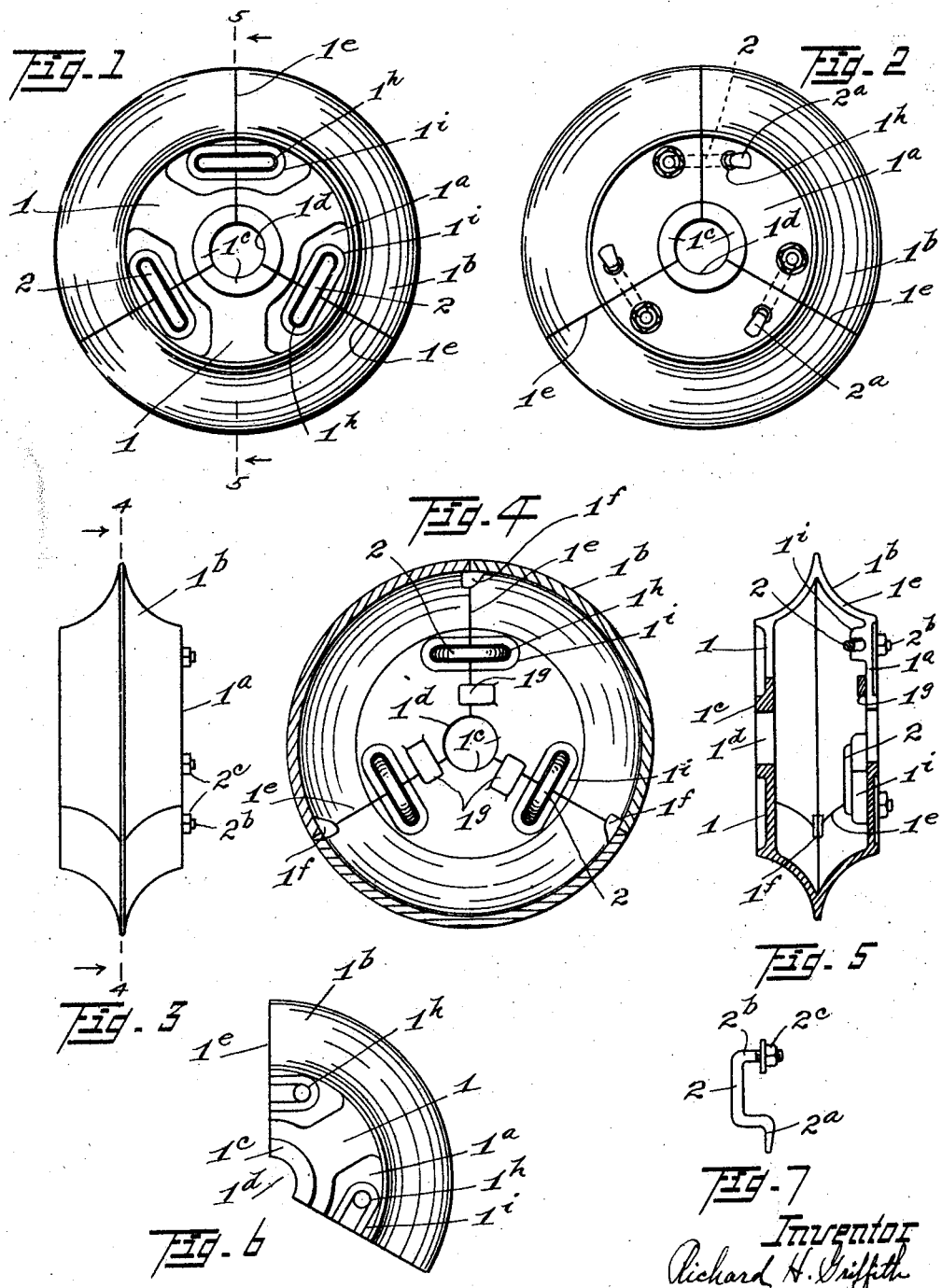

UNITED STATES PATENT OFFICE.

RICHARD H. GRIFFITH, OF BELLEVUE, OHIO, ASSIGNOR TO THE OHIO CULTIVATOR COMPANY, OF BELLEVUE, OHIO, A CORPORATION OF OHIO.

IMPLEMENT PULVERIZER DISK.

1,405,581. Specification of Letters Patent. Patented Feb. 7, 1922.

Application filed January 8, 1921. Serial No. 435,953.

*To all whom it may concern:*

Be it known that I, RICHARD H. GRIFFITH, a citizen of the United States, residing at Bellevue, in the county of Huron and State of Ohio, have invented certain new and useful Improvements in Implement Pulverizer Disks, of which the following is a specification.

My invention relates to agricultural implements and in particular to implements used to pulverize or roll the land for preparing the seed bed for planting or for other purposes.

My invention is applicable to pulverizers, land rollers, and to other types of agricultural implements. My invention is applicable to rollers having either dual axles or single axles or any number of axles with any number of pulverizing elements. In this type of implement, however, it is desirable that means be provided whereby certain predetermined pulverizer disks may be removed from the transversely extending axle shaft (or from the front and rear axle shafts where two gangs are employed), and the remaining pulverizer or implement disks be secured in fixed spaced relation to provide suitable spaces to receive the rows of growing crops, such as corn, or the like, and whereby the soil between such rows may be cultivated or packed and mulched. It is also my object to provide for removing so much of the pulverizing element less than half that may be removed without disturbing the support of the axle by the pulverizing element. This facilitates taking out of a section of the element because if a full half is taken out a portion of that half will be in the ground and resist removal in many instances. By removing less than half I am enabled to detach a portion of the element very easily and after that to remove the remainder of the element from the axle without difficulty. This end may, therefore, be secured through my invention. It is desirable that the end and median disks of this type be provided with closed sides adjacent passage ways through which the rows of growing crop pass. At the ends of the gangs it is also desirable so as to prevent the ingress of dirt and other foreign substances into the interior of the gangs of pulverizer disks.

An object of the invention is to provide a quick detachable pulverizer disk, which will be exceedingly simple in construction, cheap of manufacture and efficient in use.

A primary object is the provision of a pulverizer disk made up of radially divided segmental sections of like form, including spoked and closed sides terminating in segmental V-shaped tread and axle bearings, said divided disk sections being provided with improved guide and fastening elements adapted to hold the sections in true alignment. It is also my object to provide means to quickly attach and detach such sections in the act of mounting such disks upon and removing the same from the gang axle shaft. Another advantage of the division of the pulverizing disks into parts less than a half is to economize in repair because when a portion of the disks is broken it is cheaper to provide smaller portions than to provide an entire half for repair.

With the above mentioned and other ends in view, the invention consists in the novel construction, arrangement and combination of parts, hereinafter described, illustrated in some of its embodiments in the accompanying drawings and particularly pointed out in the appended claims.

Referring to the drawings, forming a part of this specification, Figure 1 is a side elevation of a pulverizer disk constructed in accordance with this invention taken from the open or spoked side thereof.

Fig. 2, a side elevation of the reverse or closed web side thereof, together with the fastening elements for detachably connecting the disk sections together.

Fig. 3, an edge view thereof.

Fig. 4, a central longitudinal sectional view, taken on line 4—4 of Fig. 3.

Fig. 5, a cross sectional view taken on line 5—5 of Fig. 1.

Fig. 6, a side elevation of one of the pulverizer disk sections, detached, taken from the open or spoked side thereof, the fastening elements being removed for the purpose of clearer illustration of the parts.

Fig. 7, a detailed view of one of the fastening elements, detached.

Similar numerals of reference designate like parts throughout all the figures of the drawings.

It will be observed that the improved pulverizer disk is made up of a plurality of radially divided segmental sections of like form, such sections, in the present instance, comprising spoked sides 1, and closed sides or webs 1ª, said sides terminating in segmental V-shaped treads at their outer portions, and segmental bearings 1ᶜ, at their inner portions, the V-shaped treads 1ᵇ, conjointly forming the usual tread of this type of disk, and the segmental bearings 1ᶜ, conjointly forming a central axle bearing opening 1ᵈ.

As a means of holding the disk sections in alignment and as against lateral displacement when in use and mounted upon the axle, the disks are provided with suitable aligning shoulders internally arranged and adapted to extend across the radially extending joints 1ᵉ, said aligning members, in the present instance, comprising shoulders 1ᶠ, arranged in the channel portion of the V-shaped tread of one section and adapted to fit into the corresponding recess of the other section, as shown most clearly in Figs. 4 and 5 of the drawings. As a means of securing the hub portions of the sections in true alignment, the closed or web side 1ª, of one section, may be provided with a shoulder 1ᵍ, adapted to extend across the joint 1ᵉ, formed with the adjacent section, as shown most clearly in Fig. 4 of the drawings.

As a means of quickly attaching and detaching the radially divided section in the act of mounting the disk upon or detaching the same from the gang axle shaft (not shown), the closed sides of the disk section are provided with openings 1ʰ, adjacent to their joint forming edges, said openings being adapted to receive and contain suitable fastening elements, each of said fastening elements, in the present instance, comprising a stem body or bridge portion 2, terminating at one end in a hooked head or anchor 2ª, adapted to be initially inserted in one of the openings 1ʰ, the opposite or free end of said bolt or stem 2, being provided with a threaded head 2ᵇ, adapted to extend through the opposite opening 1ʰ, and to be secured therein by means of a nut 2ᶜ. As a further means of securing the fastening or connecting elements 2, in position and further preventing radial relative displacement between the disk sections, the inner or closed sides 1ª, are preferably provided with bolt receiving boss members 1ⁱ, forming bolt receiving recesses to receive and contain the stem or bridge portions 2, of the fastening elements or bolts, and adapted to draw such disk sections into alignment as the fastening elements 2, are drawn up through the medium of the nuts 2ᶜ. I divide my disk into a plurality of sections on lines that constitute the radii emanating from the center of the axle. These lines are never in line with one another but always make an angle with respect to one another. By dividing up the disk into sections less than halves I am enabled to secure the advantages heretofore enumerated.

One of the novel arrangements and advantages in my method of attaching the several portions of each disk to one another is my means of connecting these portions without effecting this connection through the guiding shoulders. The aligning and guiding function is entirely separate and has entirely separate mechanism from the connecting elements. The result of this is that an effective disk can be secured without these aligning and guiding shoulders which may become broken off or injured, although it is advantageous and convenient to have them but not essential to my invention.

Having thus described one of the embodiments of my invention, without having attempted to set forth all the forms in which it may be made, or all the modes of its use, what I claim and desire to secure by Letters Patent, is,—

1. A pulverizer disk, comprising radially divided sections including closed sides terminating in segmental treads and bearings, said closed sides being provided with removable fastening elements arranged within said closed sides and bridging the joints of said sections.

2. A pulverizer disk, comprising radially jointed sections including disk walls provided with internal aligning lugs and fastener receiving openings, and detachable fastening elements extending through said openings and bridging said joints of said disk.

3. A pulverizer disk, comprising radially divided sections including closed sides spaced from one another terminating in segmental V-shaped treads and bearings, said closed sides being provided with a guide and detachable fastening elements arranged within said closed sides and extending across the joints of said sections.

4. A pulverizer disk, comprising radially jointed sections including disk sides provided with aligning members and segmental bearings conjointly forming a central axial bearing opening, and detachable fastening elements extending across said radially jointed sections within said disk sides.

5. In a pulverizer disk, the combination with a plurality of radially divided segmental sections including side members having guide members to hold said sections in alignment and openings adjacent the abutting portions of said sections; of fastening elements comprising hooked anchor ends extending through said openings on said sides and bridge members extending across said joints and terminating in threaded heads extending through the opposite openings, and nuts secured to said threaded heads on the outer sides of said sides.

6. In a pulverizer disk divided into a plurality of sections of lesser extent than one-half thereof, means for holding said sections in alignment with one another and detachable means for detachably connecting said sections to one another, said means extending across the joints of the sections.

7. In a pulverizer disk, a plurality of sections comprising said disk, each of said sections being less than a half and means for holding said sections in alignment with one another and connected to one another, and means for closing one side of said disk and allowing the other side to remain open.

8. In a pulverizer disk divided into a plurality of sections of lesser extent than one-half thereof, and means for detachably connecting said sections to one another.

In testimony whereof I have affixed my signature.

RICHARD H. GRIFFITH.